(12) United States Patent
Holmes (10) Patent No.: US 7,965,595 B2
(45) Date of Patent: Jun. 21, 2011

(54) SECURE DIGITAL RECORDING

(75) Inventor: Neil Anthony Holmes, Essex (GB)

(73) Assignee: AV Niche (Recording Systems) Limited (GB)

( * ) Notice: Subject to any disclaimer, the term of this patent is extended or adjusted under 35 U.S.C. 154(b) by 1621 days.

(21) Appl. No.: 10/508,149

(22) PCT Filed: Mar. 19, 2003

(86) PCT No.: PCT/GB03/01188
§ 371 (c)(1),
(2), (4) Date: Aug. 15, 2005

(87) PCT Pub. No.: WO03/081585
PCT Pub. Date: Oct. 2, 2003

(65) Prior Publication Data
US 2006/0013096 A1    Jan. 19, 2006

(30) Foreign Application Priority Data

Mar. 19, 2002 (GB) .................................. 0206390.7

(51) Int. Cl.
*G11B 5/09* (2006.01)

(52) U.S. Cl. ................. 369/47.12; 369/47.1; 369/47.11; 369/59.14

(58) Field of Classification Search .................. None
See application file for complete search history.

(56) References Cited

U.S. PATENT DOCUMENTS

| | | | |
|---|---|---|---|
| 4,010,449 A | 3/1977 | Faggin et al. | |
| 5,426,510 A | 6/1995 | Meredith | |
| 2001/0005843 A1 | 6/2001 | Tokashiki | |
| 2007/0150285 A1* | 6/2007 | Friedman | 704/270.1 |

FOREIGN PATENT DOCUMENTS

| | | |
|---|---|---|
| EP | 0 507 743 | 10/1992 |
| EP | 0 507 743 A | 10/1992 |
| JP | 07 093959 | 4/1995 |
| JP | 07 093959 A | 8/1995 |
| WO | 91 19292 A | 12/1991 |
| WO | WO 91 19292 | 12/1991 |
| WO | WO 00/69161 | 11/2000 |

OTHER PUBLICATIONS

Rieger B et al., "Digital Image Recording for Court Related Purposes", Security Technology, 1999, Proceedings IEEE 33rd Annual 1999 International Carnahan Conference on Madrid, Spain Oct. 5-7, 1999, Piscataway, NJ, USA, IEEE, US, Oct. 5, 1999, pp. 262-279, XP010355733, ISBN: 0-7803-5247-5.

(Continued)

*Primary Examiner* — Muhammad N Edun
(74) *Attorney, Agent, or Firm* — Lowe Hauptman Ham & Berner, LLP (57) ABSTRACT

A controller for secure digital recording apparatus and apparatus adapted for secure digital recording. The controller including a receiver for receiving at least one input signal from at least one element of a recording apparatus, monitoring means for monitoring a signal representing a condition status of an element of a recording apparatus, whereby a recording operation is prevented unless the monitored signal indicates the condition status satisfies a predetermined requirement. In particular, requirements as to input signals and digital recording media must be satisfied before a recording operation is allowed.

29 Claims, 9 Drawing Sheets

OTHER PUBLICATIONS

AV Niche Recording Systems Limited, "Welcome to AV Niche Recording Systems", Online, Dec. 2, 2003, XP002263684, Basildon, Essex, UK, retrieved from the internet: <URL:http://www.avniche.co.uk>, retrieved on Dec. 3, 2003.

CPS Online, "LEgal Guidance—Evidential Considerations—Video-Recorded Evidence", The Crown Prosecution Service, Online, Apr. 30, 2003, XP002263685, UK, retrieved from the Internet: <URL:http://www.cps.gov.uk/Home/LegalGuidance/13/video.htm>, retrieved on Dec. 2, 2003.

Canford Audio and A V Niche—GB 2 387 956, Letter from Dickinson Dees of May 25, 2007 in connection with the revocation action and documents enclosed with letter.

Rieger B et al: "Digital image recording for court related purposes" Security Technology, 1999 Madrid, Spain Oct. 5-7, 1999.

AV Niche Recording Systems Limited "Welcome to AV Niche Recording Systems" Dec. 2, 2003 Basildon, Essex, UK.

CPS Online: "Legal Guidance-Evidential Considerations-Video Recorded Evidence" The Crown Prosecution Service Apr. 30, 2003.

* cited by examiner

RECORD CYCLE FLOW DIAGRAM
On initial power up the control board is to check link / switch setting for mode of operation.

If set for Audio Recorder only

LCD message display to read

"AVN 300 CD BY AV NICHE
AUDIO RECORDER"

The above message is to
be permanently displayed.
Only to change if there is
a continuous monitoring
failure. i.e.

Video signal Camera 1 loss
Video signal Camera 2 loss
PIP signal loss
Microphone 1 loss
Microphone 2 loss In this instance alarm to sound
with appropriate message.
The appropriate message to
alternate with message

"STOP RECORDING
PRESS STOP"

When stop pressed alarm to
stop and message to revert to

"AVN 300 CD BY AV NICHE
AUDIO RECORDER"

If set for CD Recorder only

LCD message display to read

"AVN 300 CD BY AV NICHE
CD RECORDER"

Cycling with messages

"ELAPSED TIME 00:00:00"
and
"PRESS EJECT TO INSERT CDs
BEFORE NEXT RECORDING"

When EJECT pressed LCD
message to read

[ NB. If not in cascade
mode only CDs A
to be ejected ]

If set for CD / Audio Recorder only

LCD message display to read

"AVN 300 CD BY AV NICHE
AUDIO / CD RECORDER"

Cycling with messages

"ELAPSED TIME 00:00:00"
and
"PRESS EJECT TO INSERT CDs
BEFORE NEXT RECORDING"

When EJECT pressed LCD
message to read

[ NB. If not in cascade
mode only CDs A
to be ejected ]

"PLACE NEW CDs IN TRAY
AND THEN PRESS EJECT"

When new CDs have been
placed in trays and EJECT
has been pressed with trays
being retracted LCD message
to read (for 10 to 15 seconds)

"CHECKING CDs"

If a problem is found alarm
to sound intermittantly (1 sec
on 1 sec off) until EJECT is
pressed. LCD message
display to state the nature
of the problem.

"DECK 1,2,3 CD A,B NOT BLANK / INSERTED
PRESS EJECT AND REPLACE / INSERT CD"

— When EJECT has been pressed.

[ Control Board
on RS232 to look
for CDs in, and
track number if
error alarm.
Control Board
only to check
CDs if in
cascade mode. ]

CONTINUOUS MONITORING TO OCCUR

Video Loss Camera 1
Video Loss Camera 2
PIP Video loss
Microphone 1 loss
Microphone 2 loss } If a problem occurs then the push button controls are to become inoperative. If buttons then pressed, a continuous alarm is to sound for 10 seconds with an LCD message to describe the fault.

DURING CD RECORDING

CONTINUOUSLY MONITOR
Video Loss Camera 1
Video Loss Camera 2
PIP Video loss
Microphone 1 loss
Microphone 2 loss
CD Recording status to check that is CD which should be recording stays recording DECK 1 CD A RECORD FAIL
DECK 1 CD B RECORD FAIL
DECK 2 CD A RECORD FAIL
DECK 2 CD B RECORD FAIL
DECK 3 CD A RECORD FAIL
DECK 3 CD B RECORD FAIL If a failure occurs during recording an alarm is to sound continuously with an appropriate message which is to alternate with "STOP RECORDING" This will be a legitimate STOP press When STOP pressed the alarm is to stop sounding and the message display is to revert to If CD Recorder → "AVN 300 CD BY AV NICHE CD RECORDER"

If set for Audio / CD Recorder → "AVN 300 CD BY AV NICHE AUDIO / CD RECORDER"

FIG. 4G

SECURE DIGITAL RECORDING

The present invention relates to a controller for secure digital recording apparatus and apparatus adapted for secure digital recording. The apparatus, for example, including control and monitoring systems for preventing recording unless certain requirements relating to the recording operation are satisfied. Particular requirements that must be satisfied before a recording operation is allowed relate to, for example, valid input signals and recording media.

Digital recording technology has been available for many years. Digital recordings can be made on commercially available digital recording media such as compact disc (CD) or digital video disc (DVD) by commercially available digital recording CD and DVD drives.

Police forces and government agencies use the recording of investigative interviews as a major source of gathering primary evidence to be used in a court of law for criminal proceedings. The interview recordings are either a dedicated audio only record of the interview in progress or a visual/audio record of the interview in progress. Existing analogue recording equipment includes audio recorders such as described in WO 91/19292 and those used by the Police for recording interviews with suspects under the UK Police and Criminal Evidence Act (P.A.C.E.).

To date, recordings on analogue magnetic cassette tape have been accepted as primary evidence for the record of investigative interviews and there has been prejudice against using digital recording technology. Doubts and concerns relating to the security/authenticity of digital recording obtained in an interview situation has prejudiced police forces and government agencies away from using digital recordings in a court of law as evidential material, particularly for primary evidence purposes.

The reason for these concerns and prejudice is that reproduction/copying of digitally recorded data provides a perfect reproduced copy. Thus there is the potential for possible editing of an original recording or for the original recording to be tampered with or altered, if recorded digitally, without detection.

It is therefore desired to provide a system for secure digital recording.

In accordance with a first aspect the present invention provides a controller for secure digital recording apparatus including monitoring means for monitoring an input channel, whereby a recording operation is prevented unless a status of the monitored input channel satisfies a predetermined requirement.

Advantageously, the controller of the present invention will only allow recordings to be made if specific requirements relating to the recording operation are satisfied. Thus enabling secure recordings suitable for use in a court of law as primary evidence to be recorded.

A signal input to the input channel may be an audio signal, preferably received from a microphone. An input signal may additionally be a video signal which can be received from a video camera. The presence of signals to be recorded may be detected prior to recording being allowed to commence, this is important for secure recording of an interview. The controller may comprise monitoring means for monitoring signals from at least one element of a recording apparatus. Monitoring more than one input channel and/or more than one condition or status can advantageously provide apparatus with plural integrity and security features.

The controller may provide that the monitored input channel represents the operation of at least one element of a recording apparatus. The elements may be any one or more of; a microphone, a video camera, an audio recording device or drive. The controller may monitor more than one recording drive, thus more than one drive can perform the same tasks providing multiple copies of a recording, such multiple copies of a recording are made simultaneously and are the same.

The predetermined requirements to be satisfied may include that the recording element is connected or plugged in to the recording apparatus. Thus the recording operation may only be allowed to commence if, at least all the video signals from the required number of cameras to be recorded are present, all the microphones to be recorded are present and if everything in the system is correctly connected and plugged in. Alternatively, the recording operation may only be allowed to commence if any one of those requirements is satisfied. The predetermined requirements may be established by any known techniques in the audio/visual arts. The presence of the required video signal may be determined by checking for the sync-pulse from each camera and a picture-in-picture data from the cameras. Verifying that the microphones are correctly connected and audio signals are being received may be detected by monitoring data input signals from the microphones in a known manner.

The monitored input channel may represent the status of a digital recording device, and may further represent the presence of a recording medium in the recording device.

The recording medium may be a digital recording medium. Preferably, the predetermined requirement is that a digital recording medium is present in all of the at least one digital recording devices. The controller can then enable multiple simultaneous digital recordings to be generated at the time of recording using commercially available digital recording drives. A recording may be limited to a single continuous session or track of recording data on the recording medium.

Preferably the controller includes monitoring the condition or status such that the predetermined requirement is that the at least one digital recording medium is blank and free from previous recordings. The predetermined requirement may be further that a digital recording medium is a write-once digital recording medium. The signal of the condition or status from, or on, a recording medium may be a data signal in the form of many individual pulses which are either high or low in state and do not form a continuous signal. The data signal may be from individual pits and troughs on a recording medium.

Thus advantageously the controller may provide for secure recording technology taking advantage of digital recording media and digital recording techniques, thus allowing commercially available digital recording drives to produce secure real time digital recordings. The digital recording media and techniques are preferably comprised in CD or DVD technology or any other removable digital storage media.

The controller may monitor an input channel representing a condition or status of the presence of at least one analogue audio recording device, allowing the use of real time digital recording (with digital recording drives) combined with existing standard analogue audio cassette C90 recording technology.

In accordance with another aspect of the present invention there is provided digital recording apparatus including a controller as hereinbefore described. Advantageously the apparatus provides that requirements as to input signals and digital recording media must be satisfied before a recording operation is allowed.

Preferably the recording apparatus includes at least one digital recording device for recording on at least one digital recording medium, preferably comprising CD or DVD technology. The digital recording drives may be CD drives or DVD drives. The recording media may be CDs or DVDs. The CDs or DVDs may be coloured different colours for ease of identification during and after recording. At least part of the recording apparatus has no facility to erase a recording, or play back a recording and may be only a recording device. The predetermined requirement may prevent recording if previously recorded media are present. This means that it is not possible to edit the original digital recording without detection.

Prior to making a secure digital recording the condition or status requirement may be that the recording media is blank and of the "record only" type. "Record only" describes recording media that may have data recorded, i.e. written to only once. Such "write once" recording media may include the formats known as CD-R, DVD-R, DVD+R or DVD Master etc. Other types of recording media may include re-writable recording media which can have data recorded on them, i.e. written to them, a number of times. Examples of such "re-write" digital recording media may include formats such as CD-RW, DVD-RW, DVD+RW, DVD Master etc. A re-writable recording media may have data written only to different storage locations, but on a number of "re-writes". Alternatively, "re-writable" recording media may have data in one storage location overwritten or erased by a re-write.

Recording media whether they are record only or re-writable usually have identification marks placed on the disk at the time of their original manufacture. This embedded information may be read and may be recognised by recording and controlling apparatus. The identification information between "record only" and "re-writable" media are different and may be monitored by the present apparatus to ensure that record only digital recording media are used, thus ensuring the security and integrity of the data recorded.

Preferably the recording apparatus comprises means for cascading a recording on at least two recording media. This means that a recording of any length can be made providing for a secure recording of a long interview. Cascading is a term of the art and will be illustrated for the preferred embodiment with reference to FIG. 2.

The recording apparatus may monitor at least one input channel continually, an input signal may be continuously received by the receiver. Continually receiving and detecting signals maintains high security and integrity of the recording.

More preferably, the controller or recording apparatus, may further includes means for closing an audio file and finalising an audio recording on a recording medium, this can guarantee the security and authenticity of the recording for later use as evidential material. The user is presented with recorded media which cannot be used for recording additional information or be changed at any point in the future. Preferably, the session of digitally recording/chapter/files must be closed and finalised prior to removal of any recording media. More preferably, the digital recording process may not be paused or stopped and then restarted, this may be effected by the recording device closing and finalising the recording session/chapter/file of the drives which are actively recording when the stop button is pressed. Alternatively, a specific modification to the controller could be added so that a pause facility may be included. In this instance, the recording media cannot be removed from the recording drives until the recording sequence has been completed, i.e. the stop button being pressed at which point the recording media is finalised and closed. If the inclusion of a pause facility is required then each time the recording sequence is paused the current recording file/chapter/session will be stopped. Upon recommencing the recording sequence i.e. releasing the pause, a new and independent recording file/chapter/session will be created. When the stop button is pressed the recording media is finalised and closed. It is only at this point the media will be allowed to be ejected for the recording drives.

In a cascade mode, preferably, the recording media are presented for removal when the recording session/chapter/file has been closed and finalised.

The controller or recording apparatus may further comprise a camera or viewing means at a location remote from the recording apparatus. The camera or viewing means may act as a remote monitor by relaying a video signal to, or from, the recording apparatus, the relay of signals may only occur when a recording operation is detected. A TV monitor may be provided for remote monitoring. Preferably, if the TV monitor is switched on when the secure digital recording apparatus is not actively recording, neither video nor audio signals are output or relayed to the TV monitor. The output or relay of video or audio signals (the act of remote monitoring) to the remote viewing means (TV monitor), may be communicated to the interview room, communication may be by LEDs or an audio alarm. The reason for this feature is that a solicitor will sometimes use an interview room for a private consultation with his/her client. It is imperative that this consultation is conducted in private (without remote monitoring) and the presence of cameras and microphones would understandably give a cause for concern. The knowledge that an LED or an audio alarm accompanied monitoring would reassure the solicitor and client that they were not being monitored with the TV monitor unless the LED or audio alarm sounded.

The controller or recording apparatus may further comprise an alert means for notifying a user when the monitored signal indicates a particular condition or status, preferably the alert will be generated for an error in the system when the condition or status does not satisfy the predetermined requirement. The operation of the recording apparatus may be interactive with the user or operator. It is preferable that the user is notified by an audible alarm in addition to, or instead of, a visually displayed alarm, which may be displayed on an LCD panel message display and may be a descriptive video text message. The message may provide information on the errors in the system and can be interactive to highlight the particular error or problem and provide instructions as to how the user may correct it. The instructions may be 'Reconnect Microphone 1', for example. The instructions and alarm features enable the user to efficiently carry out the interview and recording procedure.

Preferably the user or operator is informed of any hardware errors or user induced or created errors which may have occurred. This further ensures that the recording operation will only be allowed once everything is "correct" and suitable security is in place to make a secure digital recording.

The notification means can be interactive and can provide the user with instructions in the form of message prompts. Such messages prompt and guide the user accurately through the recording procedure and ensure the security features of the system are implemented correctly.

A further advantage of the controller or apparatus of the present invention is that it can be adapted for use with existing standard analogue Police and Criminal Evidence (PACE) audio interview recorders. Additionally, it can record on a recording medium adapted to replay on commercially available audio/visual real time replay equipment. The audio/visual real time replay equipment may be a personal computer (PC) operating with the Windows '95 operating system and a commercial Media Player software package.

Alternatively, if required, the controller for secure digital recording apparatus and the recording apparatus can be adapted to provide specialised real time digital recordings for investigative interviews of an extremely sensitive nature. In order to guarantee the safety and security of all those involved in the investigative interview, the real time digital recordings may be encoded or encrypted in such a way that the recordings can only be replayed on specially adapted replay equipment which is not commercially available.

The controller for secure digital recording apparatus and the recording apparatus can be used in conjunction with an integrated/standalone standard commercial uninterrupted power supply to prevent a 240V AC mains failure negating the digital recording file closure.

Embodiments of the invention and an apparatus of the prior art (FIG. 1) will now be described by way of example only and with reference to the accompanying drawings in which:—

Figure 1:
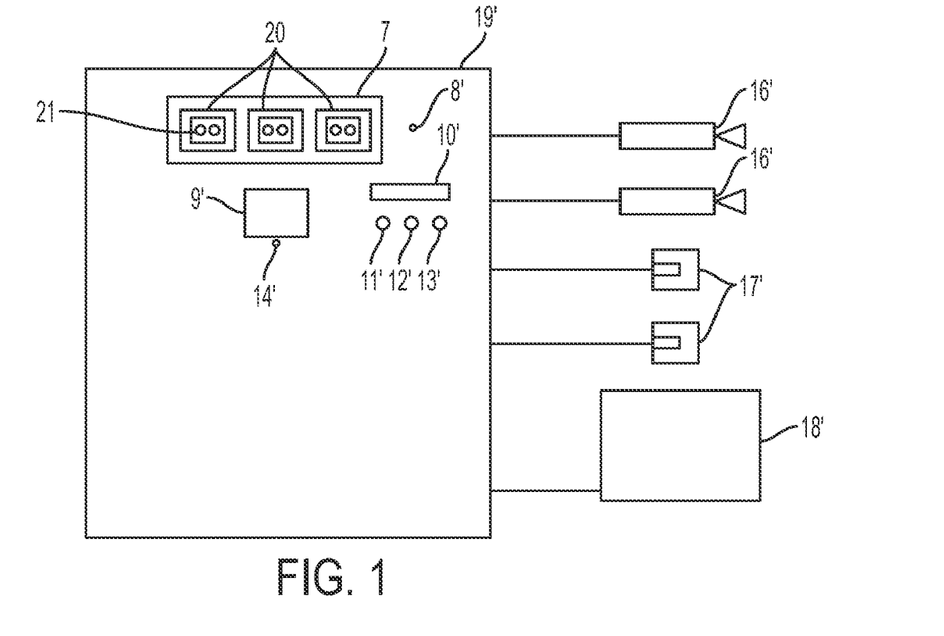
FIG. 1 shows a schematic diagram of a prior art triple copy analogue audio cassette based interview recorder.

With reference to FIG. 1, the interview recorder shown generally as 19' is well known in the art and has analogue recording deck 7. The recording deck 7 is provided with recording drives 20. Analogue audio cassettes 21 are used in recording drives 20 for recording an interview in progress. The apparatus includes one or more microphones 17' for receiving audio input signals of the interview and may optionally include one or more cameras 16' for receiving video input signals of the interview. Recording is effected with single function controls record, 11', stop 12' and eject 13'. A facility to monitor the interview in progress on a video monitor 18' remote from the recording apparatus is provided. A remote monitoring indicator light 14' is illuminated if the interview is being remotely monitored.

Recording an interview with analogue recording apparatus illustrated in FIG. 1 is well known in the art. Recording an interview with a suspect under standard Police and Criminal Evidence Act (PACE) procedure will now be described with reference to FIG. 1. Three C90 analogue audio cassettes, 21, are unwrapped in the presence of the suspect and placed in recording drive 20 in analogue recording deck 7. Recording is effected by closing the recording deck and pressing single function control button record 11'. Audio signals received from microphone(s) 17' are recorded. Further analogue recording media (not shown) may be provided to record visual data from a camera(s) 16'. Visual data from a camera(s) 16' is displayed on screen 9'.

A picture-in-picture display from remote monitor 18' can be provided in screen 9' for verifying the status of the video equipment and remote monitoring equipment. Recording indicator lights or LEDs 8' (for audio or visual recording) are provided. The lights are activated and illuminated when recording is in progress and deactivated and off when recording is not in progress.

Standard PACE procedures include an initial 8 second alarm at the beginning of an audio recording, the display of the elapsed time of the interview is recorded on the display 10' and a 2 minute 'end of tape' warning sounding after 43 minutes of elapsed time on the C90 analogue audio cassettes, 21. The warning is audible and allows the interviewer time to explain to the suspect the procedure of inserting new tapes etc. The interviewer stops the recording, unwraps and inserts three new blank, virgin cassette tapes. At the end of the interview, or at the end of the tapes, one of the three recorded tapes, the master, is sealed in a bag in front of the suspect. The other two tapes are placed on the file for Police use as necessary.

An embodiment of the invention will now be described with reference to the drawings where like numerals to the numerals primed (') of FIG. 1 refer to like features in FIGS. 2, 3 and 4.

Figure 2:
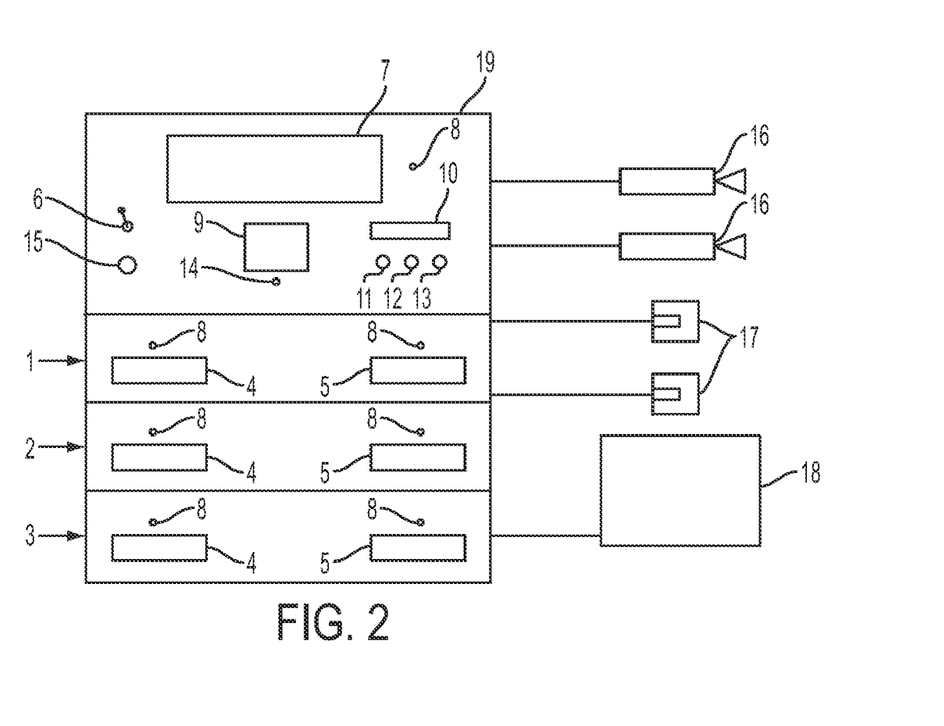
FIG. 2 shows a schematic diagram of a triple deck digital interview recorder according to an embodiment of the invention.
Figure 3:
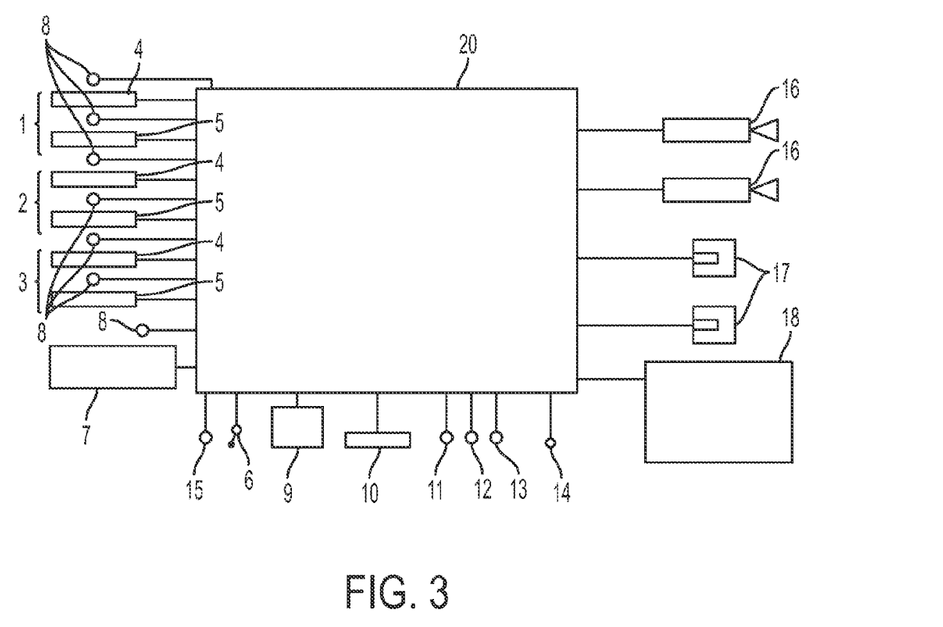
FIG. 3 shows a block diagram of the recording apparatus of FIG. 2.
Figure 4B:
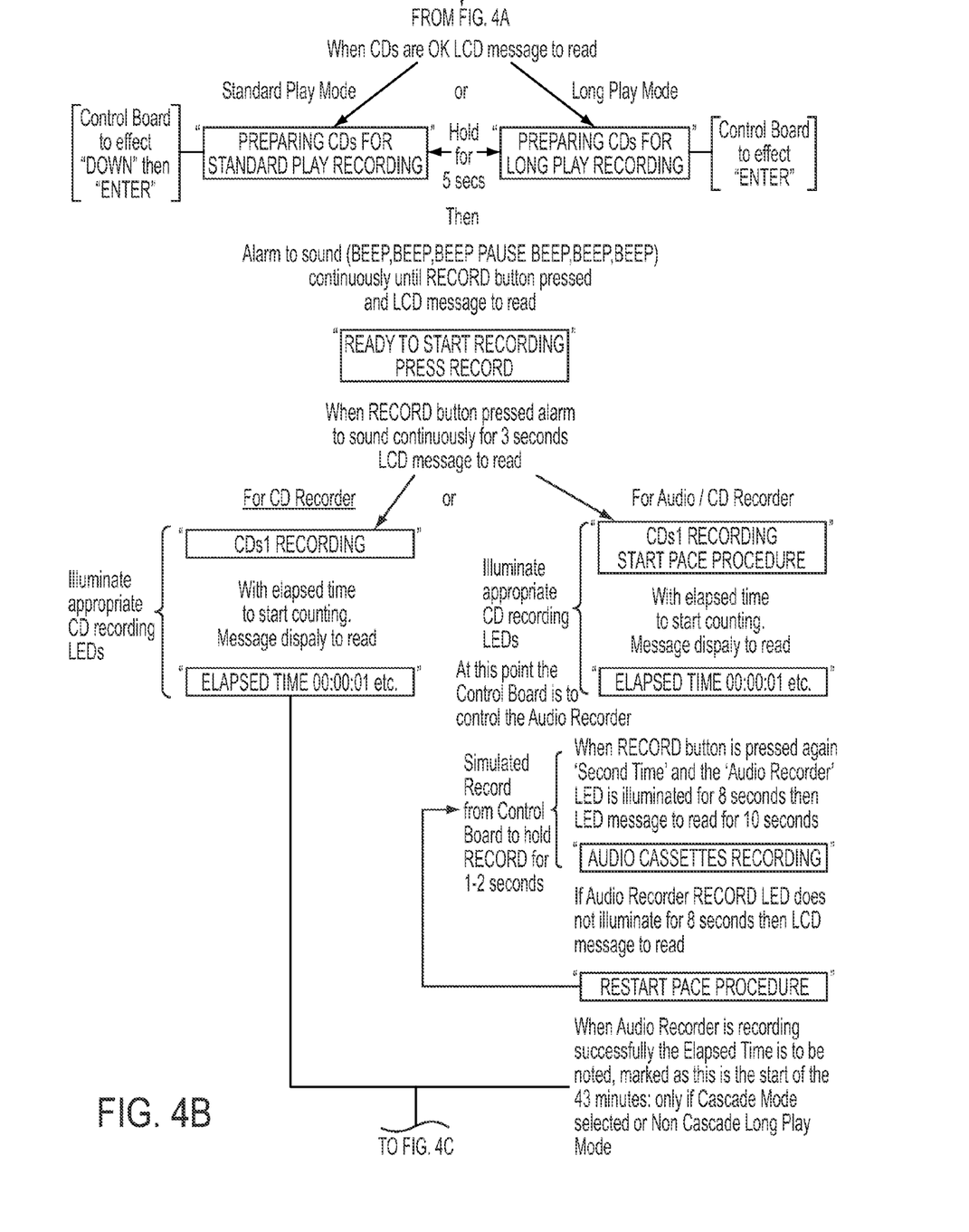
FIG. 4 shows a simplified flow diagram illustrating the digital recording processes carried with the apparatus of FIGS. 2 and 3.
Figure 4C:
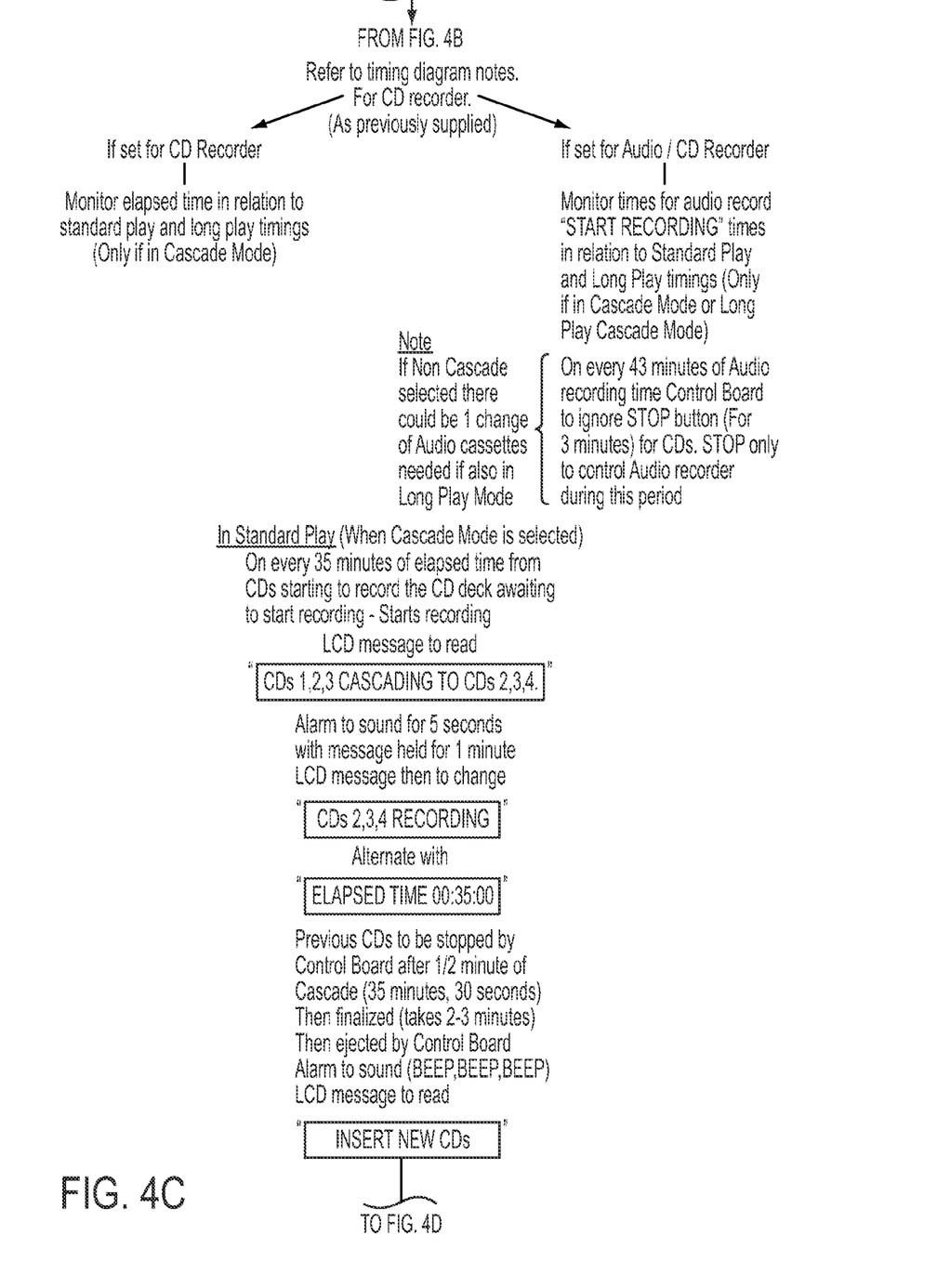
Figure 4D:
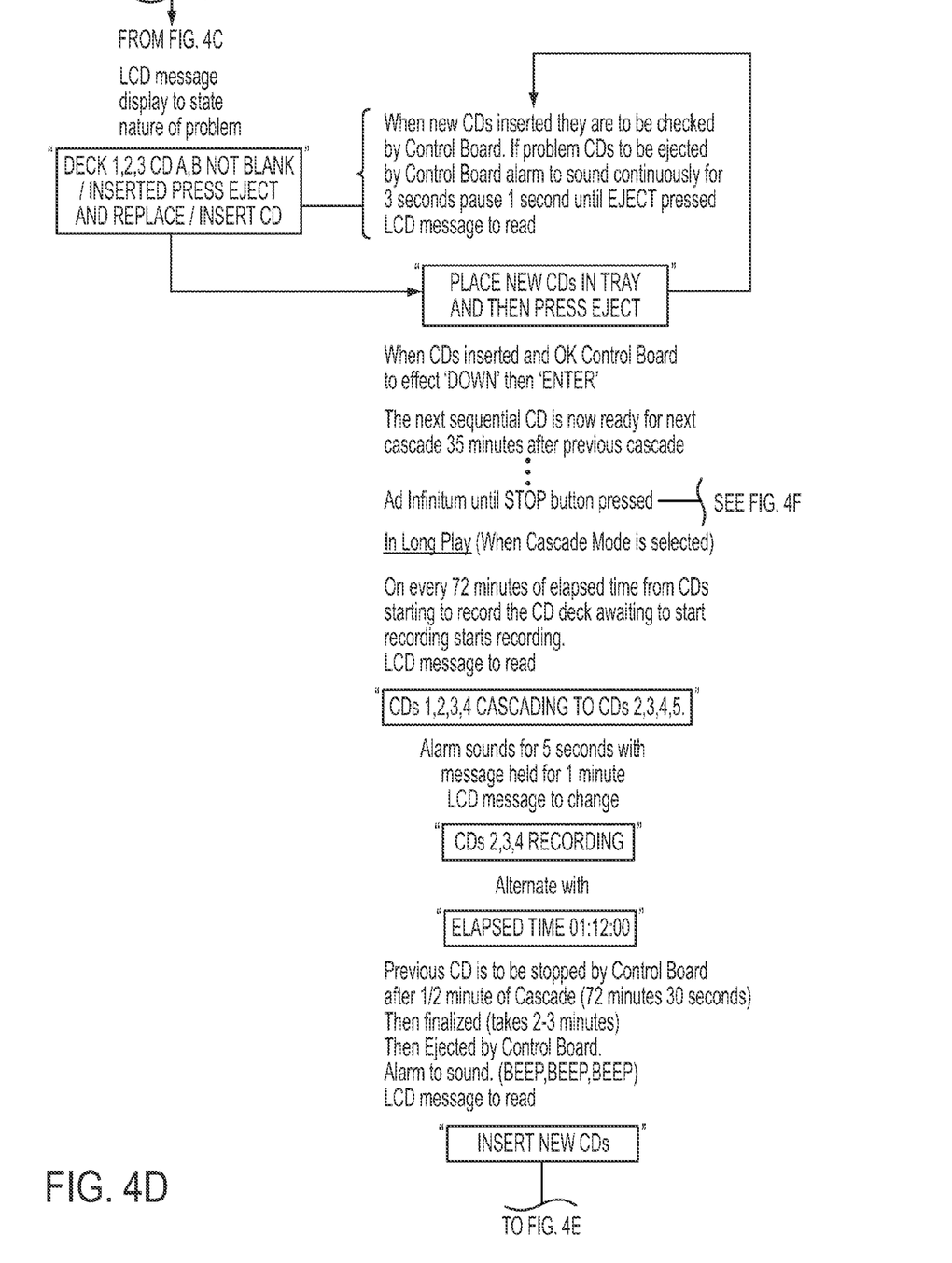
Figure 4E:
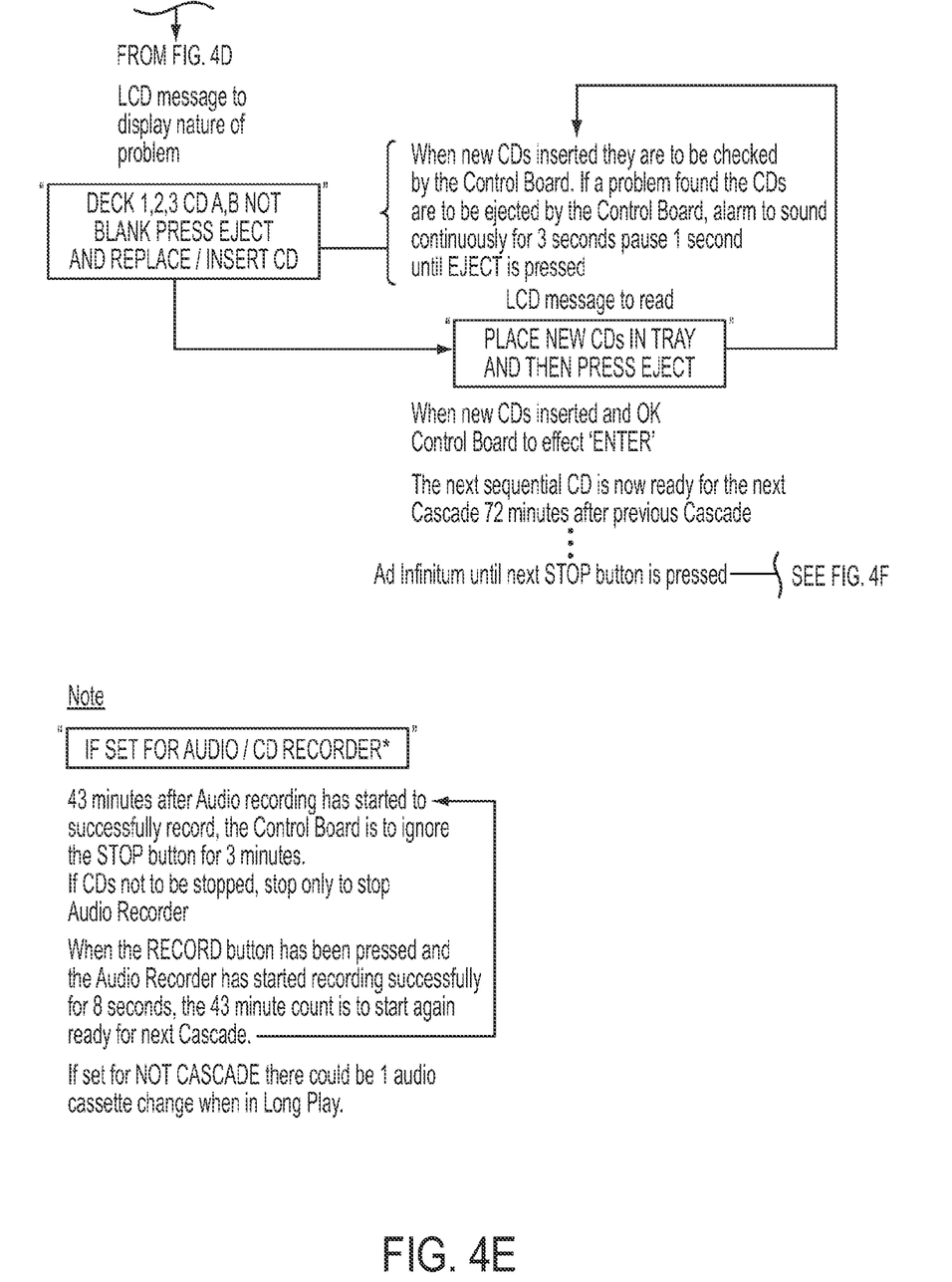
Figure 4F:
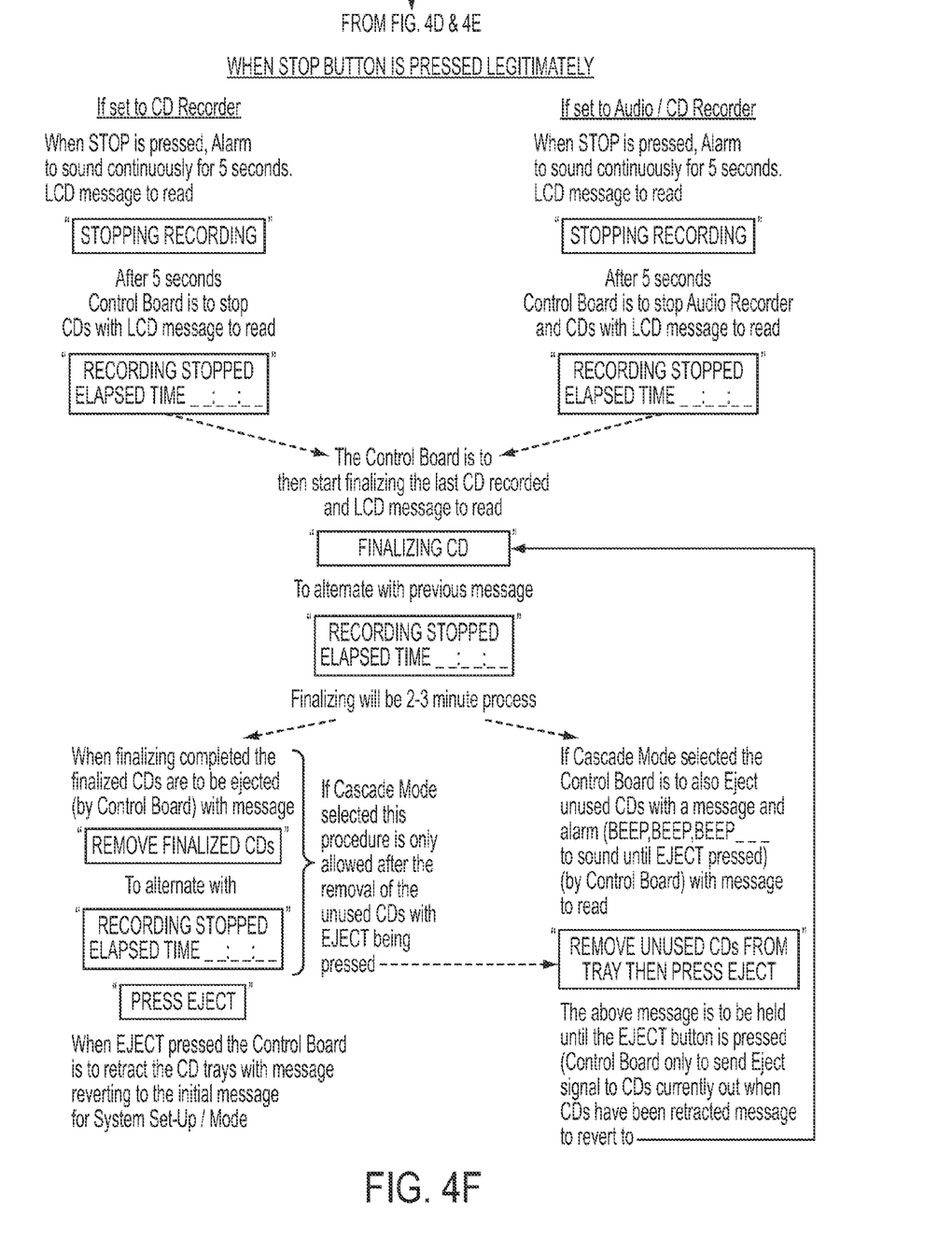
Figure 4G:
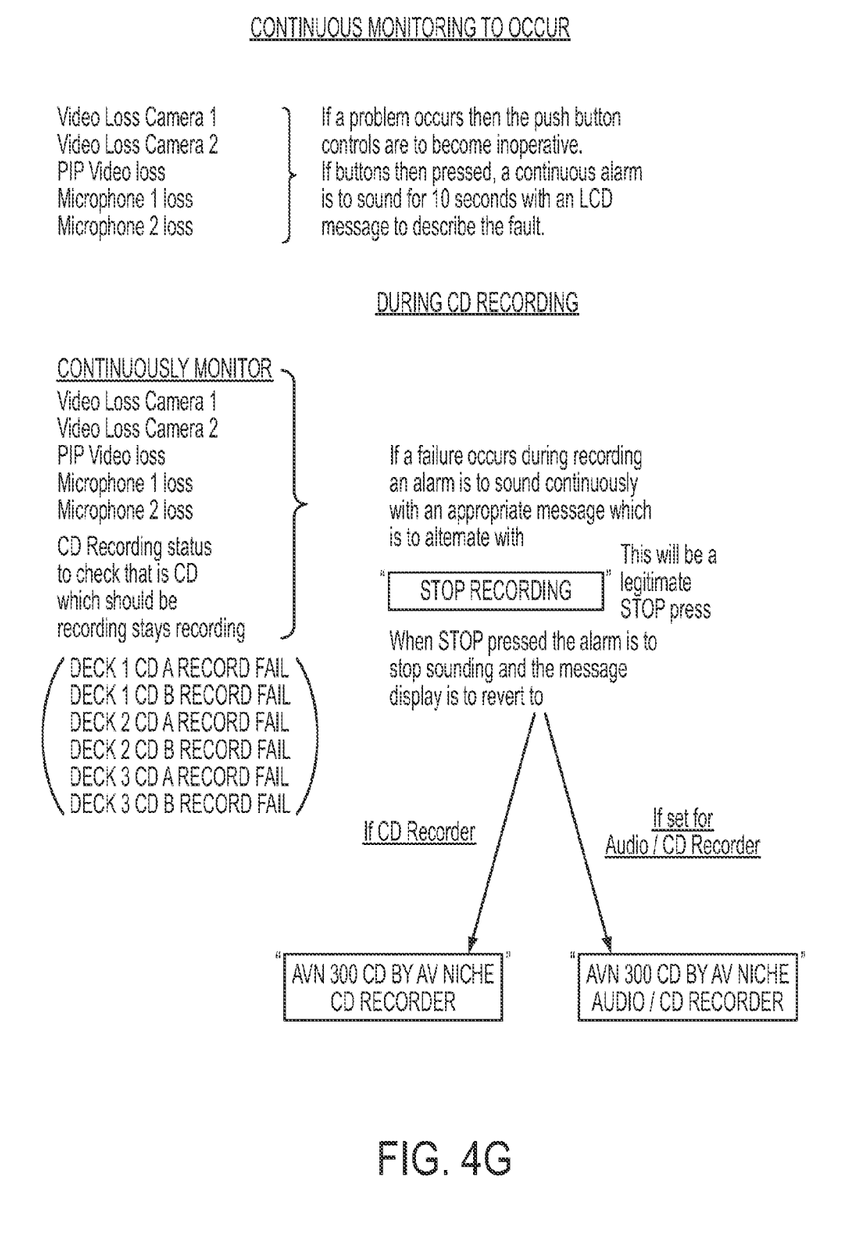

Referring to the drawings, in FIGS. 2, 3 and 4 there is shown a controller 20 for secure digital recording apparatus 19 comprising a receiver for receiving at least one input signal from at least one element 16; 17; 18 of a recording apparatus 19, monitoring means for monitoring a signal representing a condition or status of an element 16; 17; 18 of a recording apparatus 19, whereby a recording operation 4; 5 is prevented unless the monitored signal indicates the condition or status satisfies a predetermined requirement.

In FIG. 2 a triple deck 1, 2, 3 digital interview recorder 19 is illustrated with dual digital recording drives 4, 5 for each digital recording deck 1, 2, 3. Similar operational features are provided by the digital recording apparatus 19 as for prior art analogue recording apparatus 19'. For example, recording apparatus 19 records audio signals received by microphone 17, and digital real time recording input from camera 16. Apparatus 19 also includes single function controls record 11, stop 12 and eject 13. The type of recording is selected by the user and effected through manual mode select switch 15. FIG. 2 shows a rotary mode switch 15, with three settings; analogue audio recording only, analogue and digital audio recording or digital audio recording only. The user selects one of the available methods of recording using the switch 15. The analogue audio or digital recording medium is placed in recording drives 7, 4, 5 as appropriate. The depressing of single function record control button 11, effects the recording of the signals received from the microphone 17. The signals are recorded, simultaneously, on either analogue or digital recording media or on both types of media.

The signals are recorded on multiple copies of either analogue or digital recording media or both types of media. Multiple copies of the recording on digital recording media is carried out by recording using a digital recording medium in each digital recording deck 1, 2, 3, the audio signals are recorded simultaneously on the multiple copies. The audio signals are recorded on three (multiple) copies of analogue recording media by inserting multiple (three, in FIG. 2) analogue audio cassettes, 21 in drive 7.

Digital recording apparatus 19 of FIG. 2 further includes security control features, controlled by a combination of software and electronic circuitry that guarantees the security and authenticity of the recording for later use as evidential material. The security control features provide that prior to recording being allowed to commence signals must be received to confirm the requirements that all the required recoding media are present, the media are record only/write once recording media, and are blank and free from previous recording. Furthermore, prior to recording being allowed to commence video signals from a required number of cameras to be recorded and audio signals from a required number of microphones to be recorded must be present.

The recording apparatus of FIG. 2 includes an LCD message display 10 providing the user with message guidance prompts or error alerts. Dedicated digital recording drive and analogue recording drive confidence LED's 8 illuminate when respective digital and analogue recording is in progress.

FIG. 3 illustrates a schematic block interface diagram of the recording apparatus of FIG. 2 with like numerals of FIG. 3 referring to like elements of FIG. 2.

Standard PACE procedures described with reference to FIG. 1 above can also be followed and implemented on interview recorder 19 of FIG. 2. In the case of interviewing under PACE procedures the LCD display provides the user with appropriate message guidance prompts. When the recording apparatus is used for real-time digital audio/visual 16 interview recording a colour LCD monitor 9 enables live visual images to be viewed on the recording apparatus.

The overall recording operations carried out with the apparatus of FIG. 2 are illustrated in the flow chart of FIG. 4. FIG. 4 shows the LCD messages and prompts that would be displayed to the user/interviewer and that indicate the current status or next step in the recording or set-up procedure.

A further feature of the apparatus of FIG. 2 is a remote monitoring indicator light 14 provided and only illuminated if the interview is being remotely monitored, as for FIG. 1. Remote monitor 18 enables remote monitoring of the interview the TV monitor 18 is modified in such a way that when it is turned on a switch/relay is thrown. The controller of the present invention detects and monitors that the remote TV monitor is active. The video and audio signals are outputted to the remote TV monitor only if the secure digital recording apparatus is actively recording, i.e. if a recording is being made. Light 14 is illuminated by the recording apparatus to indicate to the persons in the interview room that remote monitoring is taking place.

Should the TV monitor be switched on and the secure digital recording apparatus is not actively recording, neither video nor audio signals are outputted to the TV monitor and no light 14 is illuminated.

It will be clear to those skilled in the art that the triple deck interview recording equipment 19 could be extended to quadruple etc. recording equipment with further decks. Each deck 1, 2, 3 . . . may be provided with one or two recording drives 4, 5. Two recording drives 4, 5 per recording deck allow for the provision of uninterrupted continuous recording known as cascading. Cascading is a well known technique known to those in the filed of sound and interview recording. Cascading refers to commencing a second recording prior to a first recording finishing, generating overlap of recording to ensure continuity. There are various known methods of generating a cascade, one method illustrated with reference to FIG. 2 is activated with a toggle switch 6. Selection of continuous cascade recording "loops" the recording from a recording media in a first recording drive 4 to a recording media in a second recording drive 5, and back again. With reference to FIG. 2 once a cascade operation is selected a (digital) recording medium is inserted in first and second recording drives 4, 5, recording is carried out on the medium in drive 4 followed by the medium in drive 5, then the recording medium in drive 4 is replaced with a new recording medium inserted into drive 4 just prior to the end of recording on the recording media in drive 5. At the end of recording with drive 5, drive 4 starts recording again, then the recording medium in drive 5 is replaced with new recording medium inserted into drive 5, with the next cascade, being drive 4 to drive 5 etc.

In the recording apparatus of FIG. 2, including dual recording drives 4, 5, when recording an interview that is likely to be of short duration, and within the recording time of the recording media to be used, a non-cascade operation is selected with toggle switch 6. For recording an interview which may last longer than the recording time of a single recording media continuous cascade recording is selected with toggle switch 6.

LCD messages and prompts necessary to carry out recording a cascaded interview are displayed to the user/interviewer indicate the current status or next step in the recording or set-up procedure. The messages and prompts include those relating to errors, such as alerting the user to a microphone or video camera becoming disconnected. The messages and prompts also relate to changes in the system, for example if the interview lasts for longer than the duration of the analogue recording medium, appropriate text and, where necessary, for example, under PACE procedures, appropriate audio message prompts alert the user to insert new analogue recording media and inform the suspect of the standard procedures. In the situation where the digital recording media or drives fail, or operate incorrectly the analogue recording is continued to maintain a record of events. Examples of such messages and prompts are shown in FIG. 4.

The cascading, or "looping" facility enables an interview of any duration to be continuously recorded. Selection of the non-cascade recording operation means that the uninterrupted continuous recording time is limited to the storage capacity of the recording medium. However, in the present context of police force and government agency investigative interviewing, it is normal practice that a break is provided if an interview lasts for more than two hours.

With the combination of software and electronic security features of the apparatus described in the preferred embodiment the authenticity of the digital recording is guaranteed for later use, even if a long interview is recorded and a cascade is used. The recording cascade sequence will only begin if the monitored apparatus satisfies predetermined requirements relating to the input signals and digital recording media for example. In the specific embodiment described, with reference to FIG. 2, the recording sequence will only begin if all of the following requirements are met; all the required video signals are present, all the required microphones are plugged in, all the required recording media are present, the recording media are of the record only type, the recording media and blank and free from recorded data.

The combined features of the controlling and monitoring apparatus of the present invention provide an interactive secure digital recording technology for secure digital recording apparatus suitable or use in police force and government agency investigative interviewing. Features of the technology illustrated in the preferred embodiment are highlighted below;

it guarantees the security and authenticity of the recording for later use as evidential material it will only allow record only/write once recording media to be used it will only allow record only/write once media to be used if they are blank and free from previous recording it will only allow recording to commence if all the required media are present it will only allow the recording process to begin if the video signals from the required number of cameras to be recorded are present it will only allow the recording process to begin if all the microphones to be recorded are present it will only allow the recording process to begin if everything is correct it will only allow the removal of the media when the session of recording/chapter/files have been closed and finalised it will not allow the recording process to be paused or stopped and then restarted it will close and finalise the recording session/chapter/file of the drives which are actively recording when the stop button is pressed.

when the cascade facility is used the media are only presented for removal when the recording session/chapter/file has been closed and finalised.

it will present the user with recorded media which cannot be used for recording additional information or be changed at any point in the future it can provide continuous and uninterrupted recording of an event such as an interview by the use of two digital recording drives per recording deck i.e. the recording time available is not necessarily limited to the storage capacity/time of recording available on the digital storage media being used it can generate multiple copies of the digital recording simultaneously it can be used by non technical personnel it provides the user with message prompts which describe the next event/button to be pressed it is easy to use with only three single function controls which control the recording device the single function controls are limited to record, stop and eject the controls are single function only the user of the equipment is notified by audio/visual alarms should anything be incorrect or an error occurs. The alarms are supported by descriptive messages the status of the equipment is always known by the provision of status messages it can be used and configured as a static fixed location digital recording device or as a robust portable digital recording device the recordings can have supplementary video stamped text messages/data burnt into the visual recording to support the event being recorded it can, if required, be configured to operate against a user defined operational specification by changing the messages and timing of events which occur during the recording process. i.e. a user may wish to have the cascade facility limited to only a single cascade which would limit the total recording time to 2× the recording time that is achieved by a single media.

it may be used to provide recordings which can only be read by specific replay equipment thus controlling the viewing of data which is of a sensitive nature.

it can be applied and configured to be used with CDs, DVDs or any other removable digital storage media.

It will be appreciated that the above described embodiments are given by way of example only and that various modifications thereto may be made without departing from the scope of the invention as defined in the appended claims.

For example, in the embodiments above mode select switch 15 and toggle switch 6 may be a rotary switch, a magnetic switch, electric switch or other means of effecting a user selection from a number of recording options available. Additionally, the single function control buttons may be buttons or switches or other user controlled means known in the art. Recording indicator lights for indicating analogue or digital, audio and/or visual recording may be may be light bulbs, LED's or types of indicator light. Message displays providing the user with message guidance prompts or error alerts may include liquid crystal displays, or descriptive video text messages or other notification screens or devices.

Digital recording media and recording drives may be any known in the art, examples include DVD, CD and high or double density DVD. Other examples include solid state recording media including memory cards such as MultiMedia cards (for example, Kodak Multimedia card 64 MB KOMM64 MBC), Memory sticks (for example, Sony Memory stick 128 MB SONMSA128a) and SmartMedia cards (for example, Fujifilm SmartMedia Card 128 MB ID FUJS128MBCID).

The invention claimed is:

1. A controller for a secure digital interview recording apparatus, said controller comprising:
   monitoring means for monitoring a status of an input channel, whereby a recording operation is prevented unless the monitored status of the input channel satisfies a predetermined requirement,
   wherein the status of the monitored input channel represents the operation of each of the following elements of the recording apparatus: a microphone, a video camera, and at least one, recording drive.

2. The controller as claimed in claim 1, wherein the recording device is at least one digital recording drive.

3. The controller as claimed in claim 1, wherein the predetermined requirement is that the status of the monitored channel indicates that the elements of the recording apparatus is connected or plugged in.

4. The controller as claimed in claim 1, wherein the predetermined requirement for the status of the input channel is the presence of a recording medium in the at least one recording drive.

5. The controller as claimed in claim 1, wherein a recording drive is at least one digital recording device and wherein the predetermined requirement for the status of the input channel is the presence of a digital recording medium in the at least one recording drive.

6. The controller as claimed in claim 5, wherein the predetermined requirement is that the at least one digital recording medium is blank and free from previous recordings.

7. The controller as claimed in claim 5, wherein the predetermined requirement is that the at least one digital recording medium is a write-once digital recording medium.

8. The controller as claimed in claim 1, wherein a recording device is at least one digital recording device and wherein the predetermined requirement is that a digital recording medium is present in all of the at least one digital recording drive.

9. The controller as claimed in claim 1, further comprising a camera or viewing means at a location remote from the recording apparatus for relaying a video signal to or from a recording apparatus.

10. The controller as claimed in claim 1, further including a notification alert means for notifying a user when the monitored input channel has a particular status.

11. The controller or recording apparatus as claimed in claim 10, wherein there is an error in the system when the status does not satisfy the predetermined requirement.

12. The controller as claimed in claim 1, adapted for use with existing standard analogue Police and Criminal Evidence (PACE) audio interview recorders.

13. The controller as claimed in claim 1, wherein a recording on recording medium is adapted to replay on commercially available audio/visual real time replay equipment.

14. The controller as claimed in claim 1, further adapted to provide specialized encoded real time recording on recording medium adapted to replay on specialized audio/visual real time replay equipment not commercially available.

15. The controller as claimed in claim 1, further including means for closing an audio file and finalizing an audio recording on a recording medium.

16. The recording apparatus further comprising a controller as claimed in claim 1.

17. A digital interview recording apparatus comprising:
   a controller for a secure digital interview recording apparatus including monitoring means for monitoring a status of an input channel, that status being derived from a condition of each of the following elements of said recording apparatus: (a) a microphone, (b) at least one video camera, and (c) at least one recording drive, whereby a recording operation is prevented unless the monitored status of the input channel satisfies a predetermined requirement; and at least one digital recording drive for recording an input signal on at least one digital recording medium.

18. The recording apparatus as claimed in claim 17, wherein the at least one digital recording comprises CD or DVD technology.

19. The recording apparatus as claimed in claim 17, further comprising means for cascading a recording on at least two recording media.

20. The recording apparatus as claimed in claim 17, further comprising a camera or viewing means at a location remote from the recording apparatus for relaying a video signal to or from a recording apparatus.

21. The recording apparatus as claimed in claim 20, wherein there is an error in the system when the status does not satisfy the predetermined requirement.

22. The recording apparatus as claimed in claim 17, adapted for use with existing standard analogue Police and Criminal Evidence (PAGE) audio interview recorders.

23. The recording apparatus as claimed in claim 17, wherein a recording on recording medium is adapted to replay on commercially available audio/visual real time replay equipment.

24. The recording apparatus as claimed in claim 17, further adapted to provide specialized encoded real time recording on recording medium adapted to replay on specialized audio/visual real time replay equipment not commercially available.

25. The recording apparatus as claimed in claim 17, further comprising means for closing an audio file and finalizing an audio recording on a recording medium.

26. A secure digital interview recording apparatus controller for controlling secure digital interview recording apparatus, said interview recording apparatus having at least one recording deck, the or each recording deck having at least one digital recording drive for recording on a digital recording medium, the controller comprising:
    monitoring means for monitoring the status of an input channel derived from a condition of the recording deck, wherein in use a recording operation is prevented unless the monitored status of the input channel indicates that a digital recording medium present in each of the at least one recording deck is a write once recording medium.

27. Secure digital interview recording apparatus, including a controller, at least one recording deck, the or each recording deck including at least one digital recording drive for recording on a digital recording medium, the controller including monitoring means for monitoring the status of an input channel, whereby in use a recording operation is prevented unless the monitored status of the input channel indicates that a digital recording medium present in each of the at least one recording deck is a write once recording medium.

28. A secure digital interview recording apparatus controller for controlling secure digital interview recording apparatus, the interview recording apparatus including at least one recording deck, the or each recording deck including at least one digital recording drive for recording on at least one digital recording medium, the controller including means for preventing removal of the recording medium from the recording drive unless the recording medium is finalized.

29. A secure digital interview recording apparatus, comprising:
    at least one recording deck, the or each recording deck including at least one digital recording drive for recording on at least one digital recording medium, the or each recording deck providing means for finalizing a recording on said digital recording medium; and
    a controller for controlling the at least one recording deck, wherein the controller in use prevents removal of said recording medium from the recording drive unless said recording medium has been finalized.

* * * * *